United States Patent [19]
Leou

[11] Patent Number: 5,808,818
[45] Date of Patent: Sep. 15, 1998

[54] VEHICLE INTERNAL REAR-VIEW MIRROR

[76] Inventor: Chiang Terng Leou, No. 724-3, Chung Ying, Mao Kang Tsun, Hsia Ying Hsiang, Tainan Hsien, Taiwan

[21] Appl. No.: 772,083

[22] Filed: Dec. 20, 1996

[51] Int. Cl.⁶ .............................. G02B 5/08; G02B 7/182
[52] U.S. Cl. ..................... 359/854; 359/855; 359/856; 359/857; 359/871; 359/850
[58] Field of Search ...................................... 359/854, 855, 359/856, 857, 871, 850

[56]  References Cited

U.S. PATENT DOCUMENTS

| | | | |
|---|---|---|---|
| 3,145,257 | 8/1964 | Suga | 359/854 |
| 5,124,847 | 6/1992 | Gong | 359/854 |

*Primary Examiner*—Ricky D. Shafer
*Assistant Examiner*—Mohammad Y. Sikder
*Attorney, Agent, or Firm*—Varndell Legal Group

[57] ABSTRACT

A vehicle internal rear-view mirror assembly includes a base frame mounted inside a motor vehicle between the driver's seat and the windshield glass, two retractable coupling tubes coupled to the base frame at two opposite sides, and two rear-view mirrors respectively coupled to the retractable coupling tubes by universal joints, each rear-view mirror being marked with a reference angle sign, which coincides with a respective angle sign at one front door window of the motor vehicle when the respective rear-view mirror is adjusted to a predetermined angle to reflect traffic approaching from one side, and a plurality of vertical vehicle speed reference lines through which the driver can estimate the speed of the motor vehicle approaching from behind.

3 Claims, 6 Drawing Sheets

VEHICLE INTERNAL REAR-VIEW MIRROR

BACKGROUND OF THE INVENTION

The present invention relates to vehicle internal rear-view mirrors, and more specifically to a vehicle internal rear-view mirror assembly which effectively reflects traffic approaching from both sides.

A motor vehicle is generally equipped with two rear-view mirrors bilaterally mounted on the outside, and an internal rear-view mirror mounted in the ceiling inside the motor vehicle. These rear-view mirrors can only reflect the image of a limited angle. When traffic approaching from both sides, the driver may be unstable to see the situation from the rear-view mirrors. It is dangerous to shift the motor vehicle from one lane to another under this situation.

SUMMARY OF THE INVENTION

The present invention has been accomplished to provide a vehicle internal rear-view mirror which eliminates the aforesaid problem. It is one object of the present invention to provide a vehicle internal rear-view mirror which reflects the image that that is beyond the view angle of the driver. It is another object of the present invention to provide a vehicle internal rear-view mirror which shows the best situation to shift the motor vehicle from one lane to another. It is still another object of the present invention to provide a vehicle internal rear-view mirror which enables the drivers to know the traffic situation at both sides without turning the head. According to the present invention, the vehicle internal rear-view mirror comprises two rear-view mirrors respectively mounted on two opposite sides of a base frame, which is adapted for fastening to the steering wheel support in front of the driver. The rear-view mirrors can be adjusted to any desired angle. Each rear-view mirror is marked with a reference angle sign, which coincides with a respective angle sign at one front door window of the motor vehicle when the respective rear-view mirror is adjusted to a predetermined angle to reflect traffic approaching from one side, and a plurality of vertical vehicle speed reference lines through which the driver can estimate the speed of the motor vehicle approaching from behind.

DETAILED DESCRIPTION OF THE PREFERRED EMBODIMENT

Figure 1:
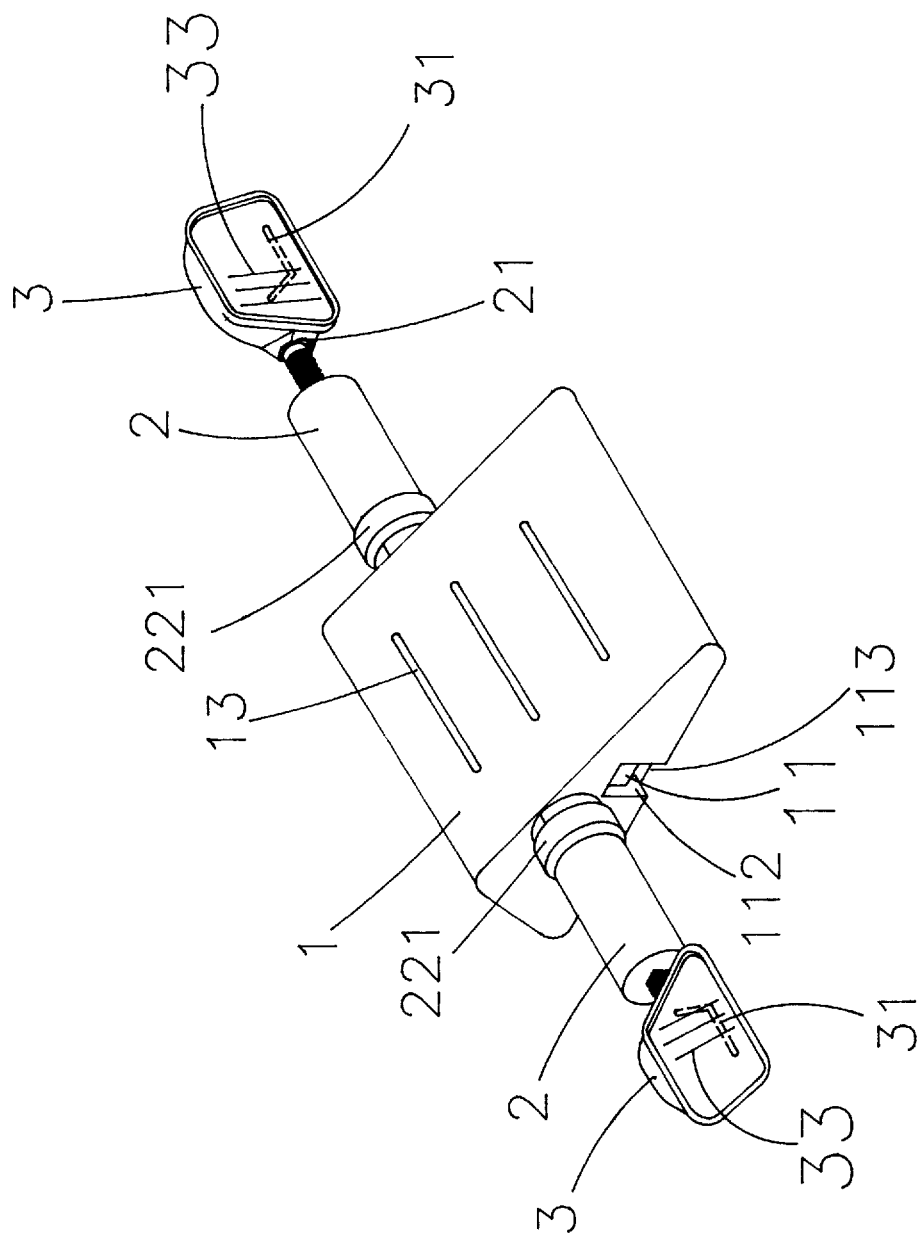
FIG. 1 is an elevational view of a vehicle internal rear-view mirror assembly according to the present invention.
Figure 2:
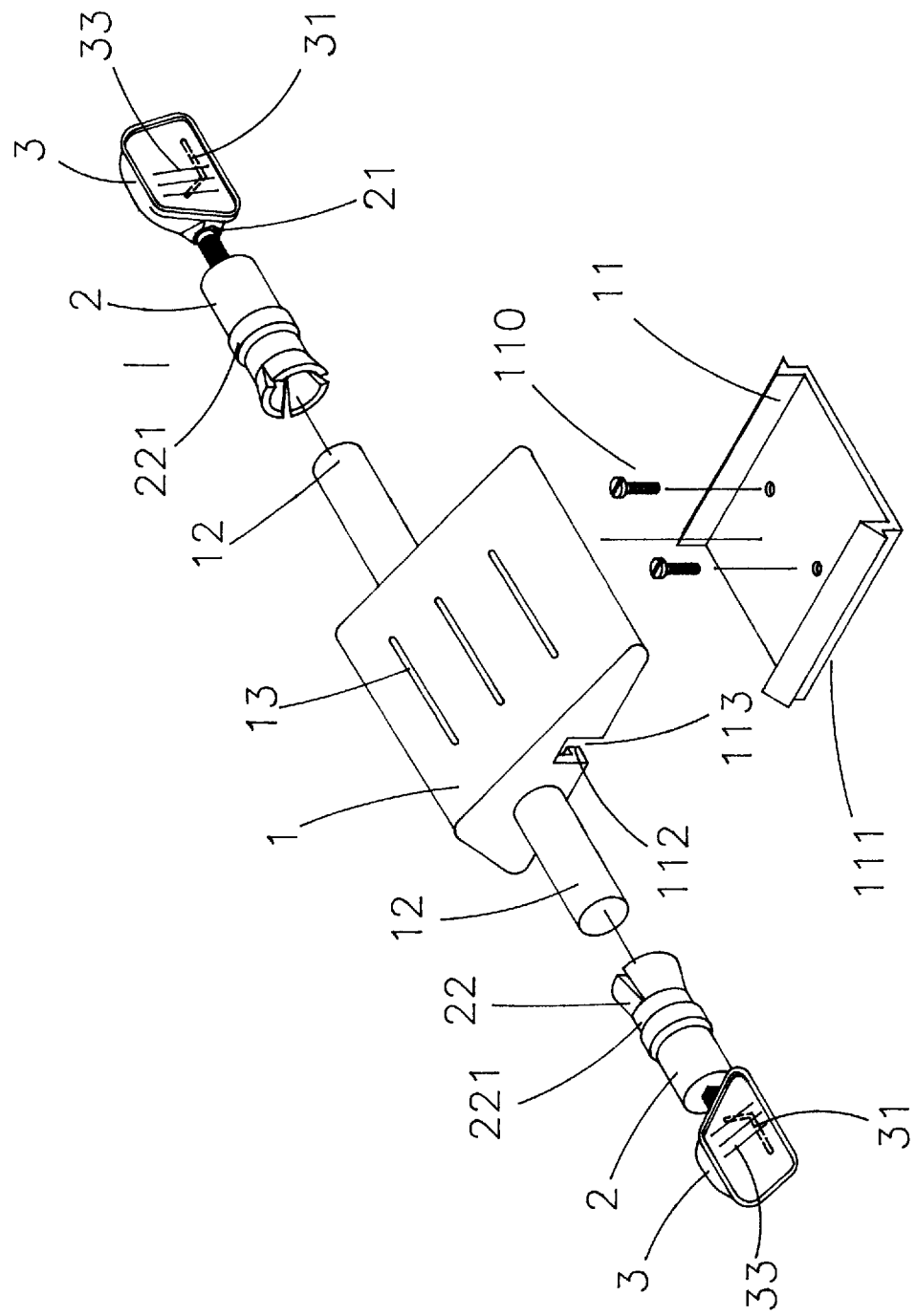
FIG. 2 is an exploded view of the vehicle internal rear-view mirror assembly shown in FIG. 1.

Referring to FIGS. 1 and 2, a vehicle internal rear-view mirror assembly in accordance with the present invention, is generally comprised of a base frame 1, a mounting plate 11, two retractable coupling tubes 2, and two rear-view mirrors 3. The base frame 1 comprises two inward coupling flanges 112 longitudinally disposed at two opposite sides, two finger holes 113 respectively cut through the inward coupling flanges 112 in the middle, two extension rods 12 perpendicularly raised from the periphery of the inward coupling flanges 112, and a plurality of transverse card slots 13 for holding cards or the like. The mounting plate 11 is adapted for fastening to the inside of a motor vehicle at a suitable location between the steering wheel and the windshield glass by screws 110, having two longitudinal coupling grooves 111 at two opposite sides respectively forced into engagement with the inward coupling flanges 112 of the base frame 1. When the base frame 1 and the mounting plate 11 are fastened together, the user can insert the fingers into the finger slots 113 to disengage the inward coupling flanges 112 from the longitudinal coupling grooves 111, and to disconnect the base frame 1 from the mounting plate 11. Each retractable coupling tube 2 comprises an expanded, split coupling end 22 at one end sleeved onto one extension rod 12 of the base frame 1, a locating ring 221, which is fastened up to compress the expanded, split coupling end 22 inwards when the expanded, split coupling end 22 is sleeved onto one extension rod 12 of the base frame 1, causing the expanded, split coupling end 22 to be firmly secured to the corresponding extension rod 12, and a universal joint 21 at one end remote from the expanded, split coupling end 22. The rear-view mirrors 3 are respectively coupled to the universal joints 21 of the retractable coupling tubes 2. Through the universal joints 12, the rear-view mirrors 3 can be respectively adjusted to the desired angle.

Figure 3:
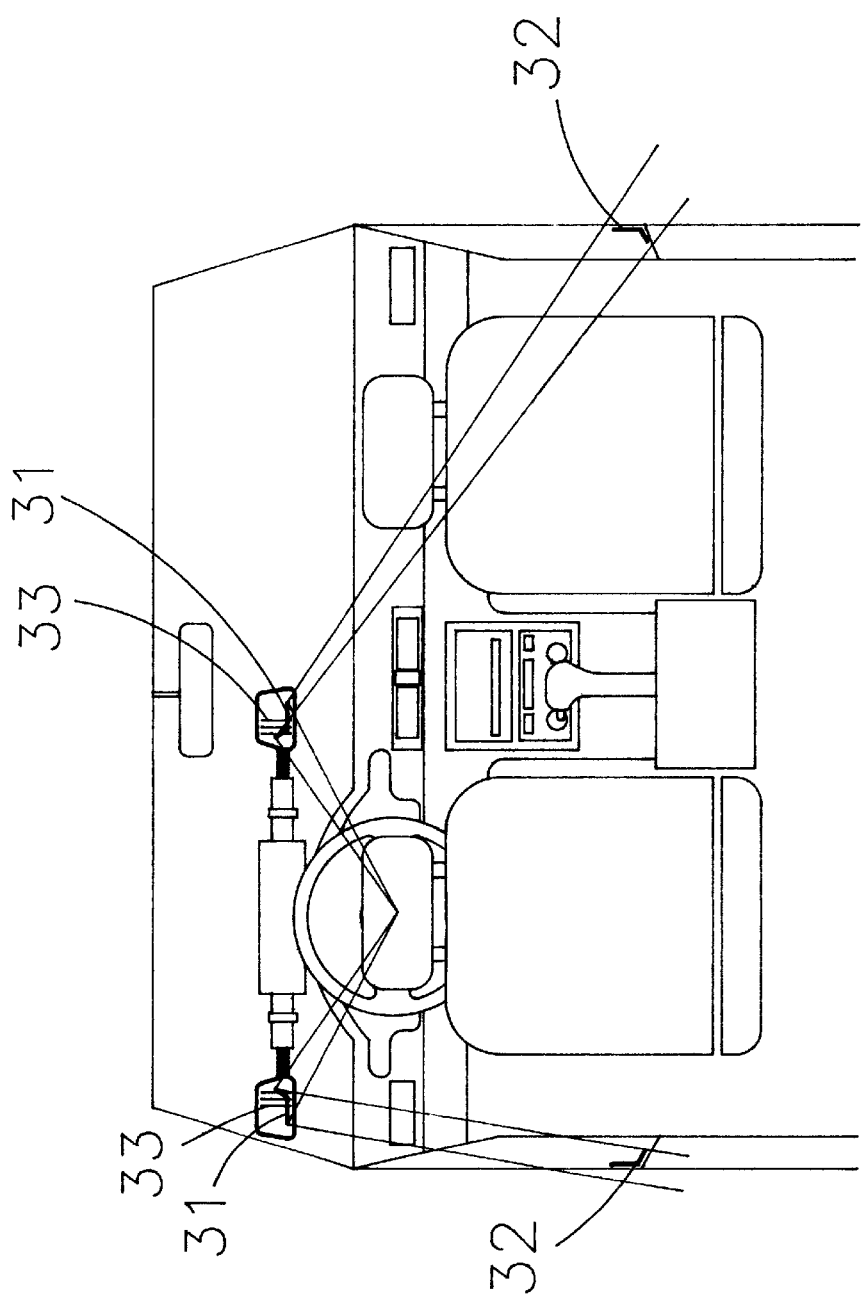
FIG. 3 is an applied view of the present invention, showing the vehicle internal rear-view mirror assembly installed in a vehicle.

Referring to FIG. 3, the rear-view mirrors 3 are respectively marked with a reference angle sign 31, the both front door windows of the motor vehicle in which the vehicle internal rear-view mirror assembly is installed are respectively marked with an angle sign 32. When the reference angle signs 31 of the rear-view mirrors 3 coincide the angle signs 32 of the front door windows of the motor vehicle, the driver can see traffic approaching from both sides through the rear-view mirrors 3.

Figure 4:
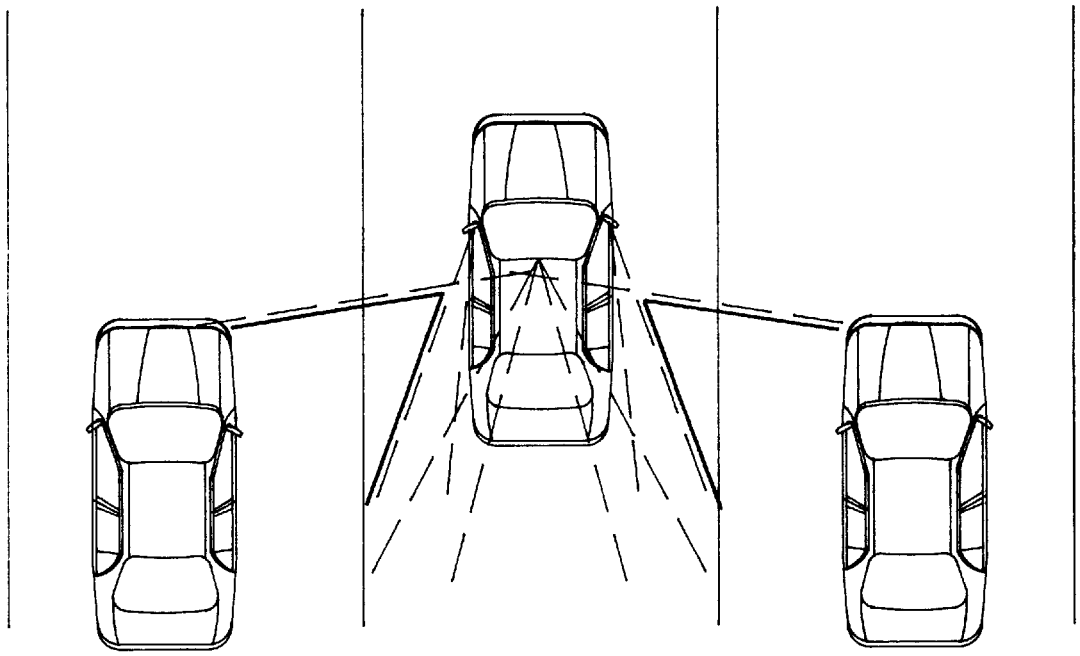
FIG. 4 is a schematic drawing showing the reflecting angle of a prior art vehicle rear-view mirror.
Figure 5:
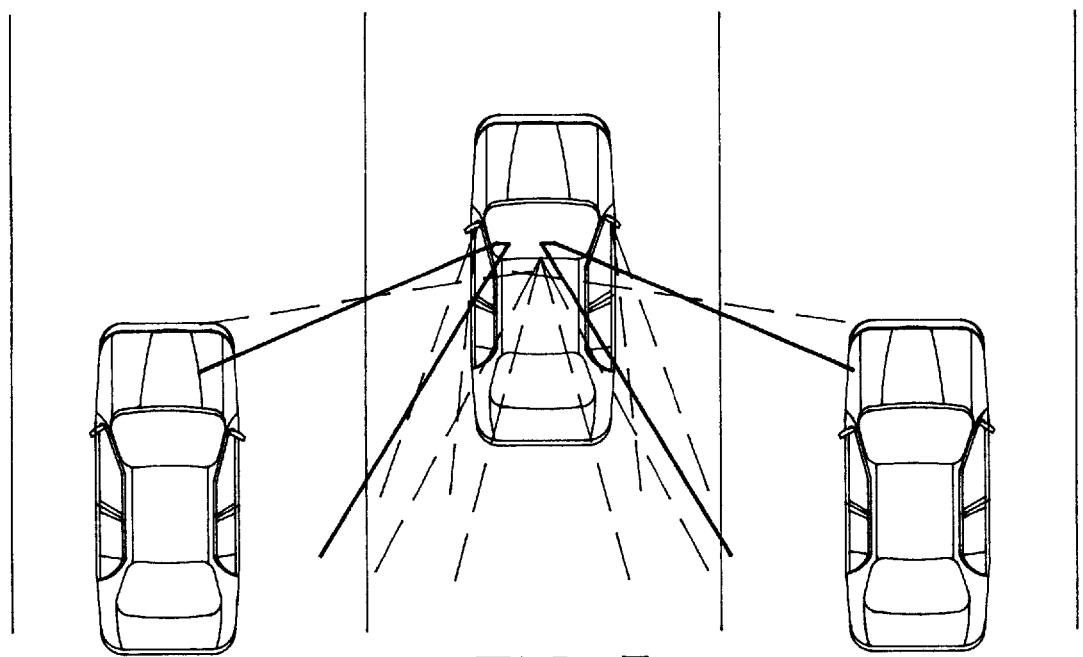
FIG. 5 is a schematic drawing showing the reflecting angles of the rear-view mirrors of the vehicle internal rear-view mirror assembly according to the present invention.

Referring to FIGS. 4 and 5, conventional rear-view mirrors can only reflect the image within a limited angle, and there is dead angle (defined within the real lines) at each side beyond the reflecting range of the prior art vehicle internal rear-view mirror (see FIG. 4). When traffic approaching from both sides, the driver cannot see the image through the rear-view mirror, and a traffic accident may occur if the driver changes the direction of the motor vehicle from one lane to another under this condition. The rear-view mirrors of the vehicle internal rear-view mirror assembly can be adjusted to reflect traffic approaching from both sides (see the real lines in FIG. 5).

Figure 6:
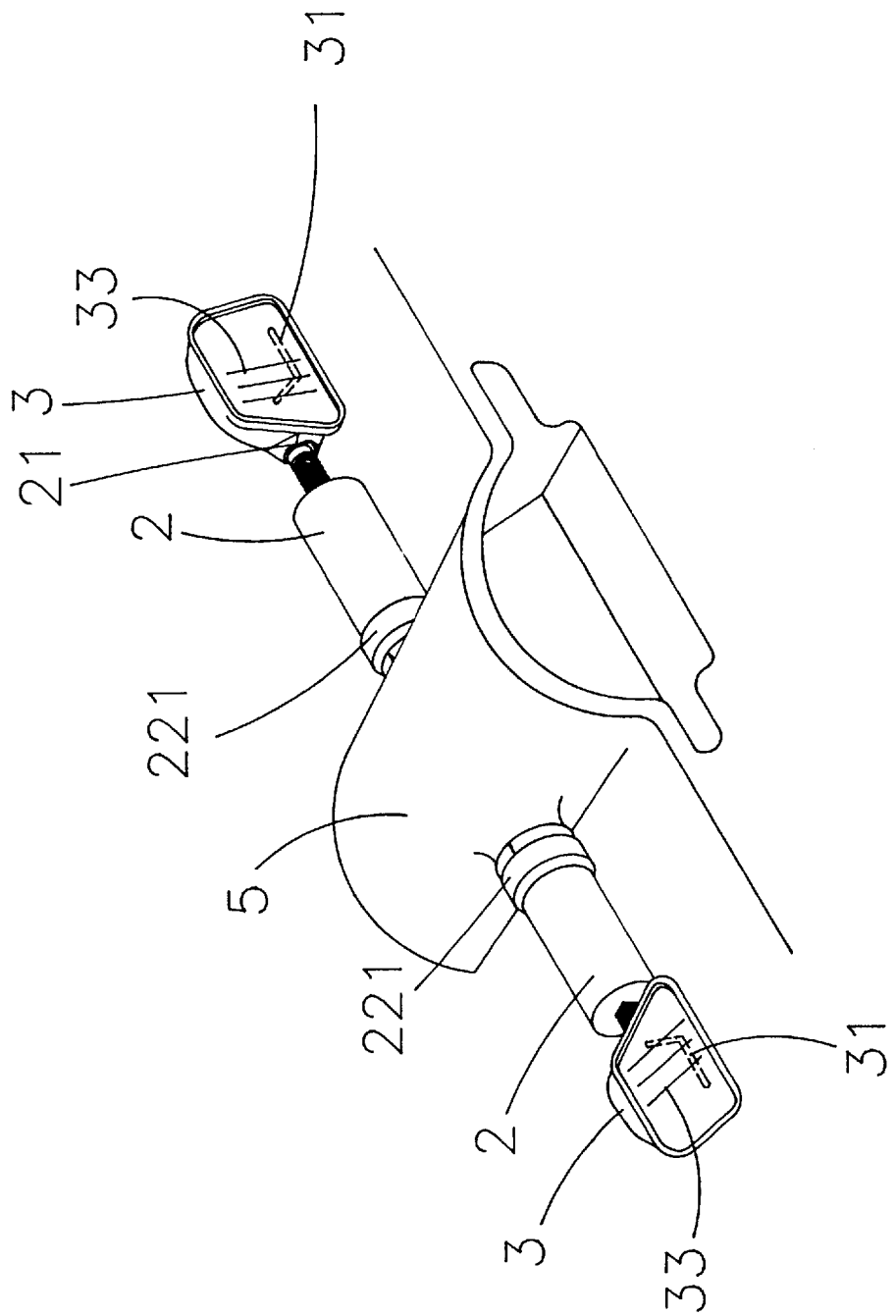
FIG. 6 is an elevational view of an alternate form of the present invention.

FIG. 6 shows an alternate form of the present invention, in which the base frame is a part of the steering wheel support of the motor vehicle.

Figure 7:
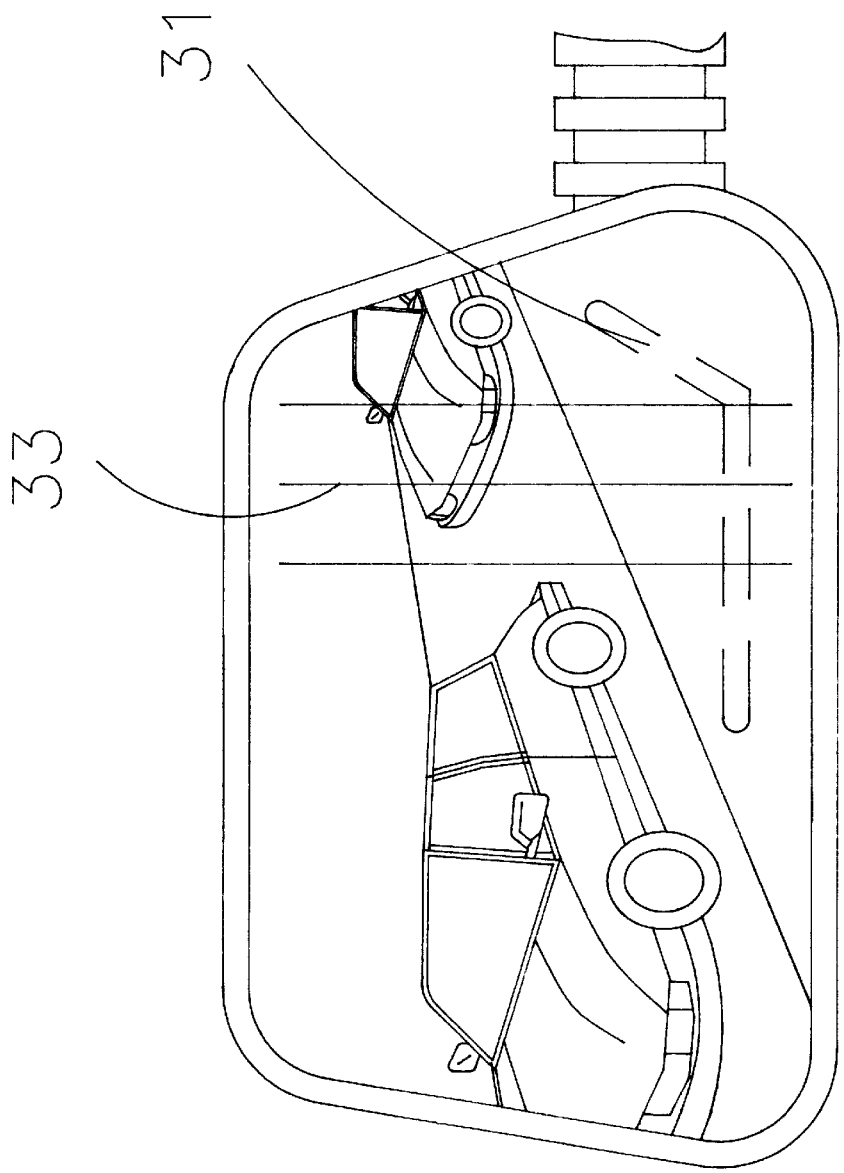
FIG. 7 is an enlarged view of one rear-view mirror of the vehicle internal rear-view mirror assembly according to the present invention.

Referring to FIG. 7, each rear-view mirror 3 has vertical vehicle speed indication lines 33. Through the vertical vehicle speed indication lines 33, the driver can estimate the speed of the motor vehicle approaching from behind.

It is to be understood that the drawings are designed for purposes of illustration only, and are not intended as a definition of the limits and scope of the invention disclosed.

I claim:

1. A vehicle internal rear-view mirror assembly mounted inside a motor vehicle in front of a driver's seat, comprising:

a base frame, said base frame comprising two inward coupling flanges longitudinally disposed at two opposite sides, two finger holes respectively cut through the inward coupling flanges in the middle, and two extension rods perpendicularly raised from the periphery of said inward coupling flanges;

a mounting plate for securing said base frame between a steering wheel and a windshield glass inside of the motor vehicle, having two longitudinal coupling grooves at two opposite sides respectively forced into engagement with the inward coupling flanges of said base frame;

two retractable coupling tubes respectively coupled to the extension rods of said base frame, each of said retractable coupling tubes comprising an expanded, split coupling end at one end sleeved onto one extension rod of said base frame, a locating ring mounted around said expanded, split coupling end and fastened up to fix said expanded, split coupling end to the corresponding extension rod, and a universal joint at one end remote from said expanded, split coupling end; and two rear-view mirrors respectively coupled to the universal joints of said retractable coupling tubes;

wherein said rear-view mirrors are respectively marked with a reference angle sign, which coincides with a respective angle sign at one front door window of the motor vehicle when the respective rear-view mirror is adjusted to a predetermined angle to reflect traffic approaching from one side, and a plurality of vertical vehicle speed reference lines through which the driver can estimate the speed of the motor vehicle approaching from behind.

2. The vehicle internal rear-view mirror assembly of claim 1 wherein said mounting plate is fastened to a steering wheel support of the motor vehicle between the steering wheel and the windshield glass.

3. The vehicle internal rear-view mirror assembly of claim 1 wherein the vertical vehicle speed reference lines of each rear-view mirror are disposed in parallel at one side near the driver of the motor vehicle, and the reference angle sign is disposed near a bottom side below the respective vertical vehicle speed reference lines.

* * * * *